(12) United States Patent
Book

(10) Patent No.: US 9,024,994 B2
(45) Date of Patent: May 5, 2015

(54) METHOD, APPARATUS AND SYSTEM FOR INCORPORATING VOICE OR VIDEO COMMUNICATION INTO A TELEVISION OR COMPATIBLE AUDIO CAPABLE VISUAL DISPLAY

(75) Inventor: Michael Book, Monroe, LA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 184 days.

(21) Appl. No.: 13/558,084

(22) Filed: Jul. 25, 2012

(65) Prior Publication Data

US 2012/0293601 A1    Nov. 22, 2012

Related U.S. Application Data

(63) Continuation of application No. 12/418,702, filed on Apr. 6, 2009, now Pat. No. 8,253,772.

(60) Provisional application No. 61/042,384, filed on Apr. 4, 2008.

(51) Int. Cl.
*H04N 7/14* (2006.01)

(52) U.S. Cl.
CPC .................... *H04N 7/148* (2013.01)

(58) Field of Classification Search
CPC ......... H04N 7/14; H04N 7/141; H04N 7/142; H04N 7/144; H04N 7/148; H04N 21/478; H04N 21/42204; H04M 1/72552
USPC ................ 348/14.01–14.16, 552; 725/131
See application file for complete search history.

(56) References Cited

U.S. PATENT DOCUMENTS

| | | | |
|---|---|---|---|
| 4,349,701 | A | 9/1982 | Snopko |
| 4,392,022 | A | 7/1983 | Carlson |
| 4,456,925 | A | 6/1984 | Skerlos et al. |
| 5,987,106 | A | 11/1999 | Kitamura |
| 6,141,058 | A | 10/2000 | Lagoni et al. |
| 6,535,590 | B2 | 3/2003 | Tidwell et al. |

(Continued)

FOREIGN PATENT DOCUMENTS

| | | |
|---|---|---|
| CN | 1491039 | 4/2004 |
| JP | 63146647 | 6/1988 |

(Continued)

OTHER PUBLICATIONS

U.S. Appl. No. 12/418,702; Non Final Office Action dated Jan. 3, 2012; 18 pages.

(Continued)

*Primary Examiner* — Melur Ramakrishnaiah
(74) *Attorney, Agent, or Firm* — Swanson & Bratschun, L.L.C.

(57) ABSTRACT

Voice or video communication is incorporated into a television or compatible audio capable visual display by routing a television signal through a communication interface apparatus connected to a voice or video communication network and switching between a call and at least the audio portion of the television signal when a call is detected and the user chooses to answer the call in response to an on-screen menu superimposed on the video portion of the television signal. The communication interface apparatus includes a controller that is configured to allow speed dialing using a wireless remote, as well as making calls from a user-defined contact list or a regional phone directory that is updatable from a remote source via the Internet.

20 Claims, 4 Drawing Sheets

(56) References Cited

U.S. PATENT DOCUMENTS

| | | |
|---|---|---|
| 6,690,778 B2 | 2/2004 | Kahn |
| 6,760,415 B2 | 7/2004 | Beecroft |
| 6,831,969 B2 | 12/2004 | Ju |
| 7,184,522 B2 | 2/2007 | Brunelle et al. |
| 7,194,259 B2 | 3/2007 | DeLine |
| 8,253,772 B2 | 8/2012 | Book |
| 2002/0044199 A1 | 4/2002 | Barzebar et al. |
| 2002/0047892 A1* | 4/2002 | Gonsalves, Jr. ............ 348/14.06 |
| 2003/0005462 A1 | 1/2003 | Broadus et al. |
| 2003/0041333 A1* | 2/2003 | Allen et al. .................. 725/106 |
| 2005/0232249 A1 | 10/2005 | Mishra |
| 2005/0242167 A1 | 11/2005 | Kaario et al. |
| 2005/0267893 A1 | 12/2005 | Headd et al. |
| 2006/0048207 A1 | 3/2006 | Martin |
| 2006/0132595 A1* | 6/2006 | Kenoyer et al. ............ 348/14.08 |
| 2006/0291506 A1 | 12/2006 | Cain |
| 2007/0037612 A1 | 2/2007 | Roh |
| 2007/0139514 A1 | 6/2007 | Marley |
| 2007/0277215 A1* | 11/2007 | Allen et al. .................. 725/131 |
| 2008/0019494 A1* | 1/2008 | Toda ........................ 379/142.16 |
| 2008/0062337 A1 | 3/2008 | Maier |
| 2009/0251526 A1 | 10/2009 | Book |

FOREIGN PATENT DOCUMENTS

| | | |
|---|---|---|
| JP | 02131691 | 5/1990 |
| JP | 07184174 | 7/1995 |

OTHER PUBLICATIONS

U.S. Appl. No. 12/418,702; Notice of Allowance dated Apr. 25, 2012; 10 pages.

U.S. Appl. No. 12/418,702; Issue Notification dated Aug. 8, 2012; 1 page.

* cited by examiner

METHOD, APPARATUS AND SYSTEM FOR INCORPORATING VOICE OR VIDEO COMMUNICATION INTO A TELEVISION OR COMPATIBLE AUDIO CAPABLE VISUAL DISPLAY

CROSS-REFERENCE TO RELATED APPLICATIONS

This application is a continuation of U.S. application Ser. No. 12/418,702 (the "702 Application"), filed Apr. 6, 2009 by Michael Book and entitled, "Method, Apparatus and System for Incorporating Voice or Video Communication Into a Television or Compatible Audio Capable Visual Display," which claims priority from U.S. Provisional Patent Application No. 61/042,384, filed on Apr. 4, 2008, the disclosure of which is incorporated herein in its entirety.

BACKGROUND OF THE INVENTION

1. Technical Field

This invention relates to a method, apparatus and system for incorporating a time division multiplexed ("TDM"), broadband, or wireless voice and/or video communication into a television or compatible audio enabled visual display device. This communication can be delivered in an analog or digital format, and may or may not include an accompanying video communications stream or other attachment.

2. Discussion of the Background Art

Voice calls, whether TDM or broadband have long been terminated utilizing a "set". TDM sets terminate calls by utilizing the circuit created when the receiver is taken off-hook. Likewise, broadband calls are normally delivered to a device that is either hand held or desk/table top bound or even computer based which terminate packets converting them to audio. Each of these methods provides wireless handset capabilities so that the communication can span some distance without physical connection. Other known devices, such as My One Remote, have attempted to provide "TV Viewing" and voice mail reception relationships. However, such devices have limited functionality and have not provided incorporation of the service into one functional process. Further attempts to incorporate voice calls into a TV viewing experience can be seen with caller ID on the TV (a service of DISH Network, DirecTV and others). Additionally, other companies have introduced universal remote control devices that allow users to perform activities on a menu without toggling the status of a single item. While all of these products and services are popular and effective, a need remains for a cost-effective product that provides the user the capability to answer and initiate calls through a television set with greater functionality and flexibility.

SUMMARY OF THE INVENTION

The present invention overcomes disadvantages of the prior art by enabling a communication recipient to handle a voice and/or video communication utilizing a pre-existing television set or monitor with audio capabilities and an unprecedented degree of functionality and flexibility.

In accordance with a first aspect of the present invention, a system for incorporating voice or video communication into a television or compatible audio capable visual display includes a television tuner configured to receive a television signal containing audio and video data from a remote source and to transmit a first digital video signal corresponding to the video data and a first audio signal corresponding to the audio data; a communication interface apparatus; a digital display configured to receive a second video signal from the communication interface apparatus and to display visual images based on the second video signal; an audio system configured to receive a second audio signal from the communication interface apparatus and to generate audible sounds based on the audio signal; a remote control unit; and a microphone coupled with one of the communication interface apparatus and the remote control unit and configured to generate a third audio signal in response to audible sounds, wherein the communication interface apparatus is configured to receive the third audio signal from the microphone and to transmit the third audio signal over the communication network. In an embodiment, the communication interface apparatus includes one or more television inputs for receiving the first audio and video signals from the television tuner; one or more communication inputs for receiving from a communication network a voice communication signal containing audio data or a video communication signal containing both audio and visual data; one or more outputs for transmitting a second digital video signal and a second audio signal from the communication interface apparatus; a call detection device connected to the one or more communication inputs and configured to detect a voice or video communication signal and associated data and to generate a notification signal when a communication signal is detected; a digital memory device for storing at least a user-defined contact list, a speed dial list and a call log based on the associated data; a first wireless communication device configured to receive wireless command signals from a user; and a controller coupled with the one or more television inputs, the one or more communication inputs, the one or more outputs, the call detection device, the memory device and the wireless communication device. In an embodiment, the digital memory device stores at least one set of instructions executable by the controller to check for call notification and command signals; if there is a call notification signal, combine data associated with the voice or video communication signal with at least one of the first audio and video signals to produce at least one combined signal superimposing the associated data over the video signal and transmit the at least one combined signal to the one or more outputs; if a command is received to answer the call while the at least one combined signal is transmitted, substitute the voice or video communication signal for at least one of the first audio and video signals and transmit the substituted signal to the one or more outputs; if a command is received to terminate the call, or if there is no notification signal, transmit the first audio and video signals from the television tuner to the one or more outputs.

In accordance with a second aspect of the invention, a communication interface apparatus includes one or more television inputs for receiving the first audio and video signals from the television tuner; one or more communication inputs for receiving from a communication network a voice communication signal containing audio data or a video communication signal containing both audio and visual data; one or more outputs for transmitting a second digital video signal and a second audio signal from the communication interface apparatus; a call detection device connected to the one or more communication inputs and configured to detect a voice or video communication signal and associated data and to generate a notification signal when a communication signal is detected; a digital memory device for storing at least a user-defined contact list, a speed dial list and a call log based on the associated data; a first wireless communication device configured to receive wireless command signals from a user; and a controller coupled with the one or more television inputs, the one or more communication inputs, the one or more outputs, the call detection device, the memory device and the wireless communication device. In an embodiment, the digital memory device stores at least one set of instructions executable by the controller to check for call notification and command signals; if there is a call notification signal, combine data associated with the voice or video communication signal with at least one of the first audio and video signals to produce at least one combined signal superimposing the associated data over the video signal and transmit the at least one combined signal to the one or more outputs; if a command is received to answer the call while the at least one combined signal is transmitted, substitute the voice or video communication signal for at least one of the first audio and video signals and transmit the substituted signal to the one or more outputs; if a command is received to terminate the call, or if there is no notification signal, transmit the first audio and video signals from the television tuner to the one or more outputs.

In accordance with a third aspect of the invention, a method of incorporating voice or video communication into a television or compatible audio capable visual display includes the steps of receiving at a communications interface apparatus a television broadcast from a tuner containing first audio and video signals; receiving at the communications interface apparatus a voice communication signal from a communications network containing audio data or a video communication signal containing both audio and video data; transmitting a second digital video signal and a second audio signal from the communication interface apparatus; detecting at the communications interface apparatus a voice or video communication signal and associated data and generating a notification signal when a communication signal is detected; storing at the communications interface apparatus at least a user-defined contact list, a speed dial list and a call log based on the associated data; receiving at the communications interface apparatus wireless command signals from a wireless remote; and using a controller in the communications interface apparatus to check for notification and command signals; if there is a notification signal, combine data associated with the voice or video communication signal with at least one of the first audio and video signals to produce at least one combined signal with a call notification feature and transmit the at least one combined signal to the one or more outputs; if a command is received to answer the call while the at least one combined signal is transmitted, substitute the voice or video communication signal for at least one of the first audio and video signals and transmit the substituted signal to the one or more outputs; and if a command is received to terminate the call, or if there is no notification signal, transmit the first audio and video signals from the television tuner to the one or more outputs.

Other objects and advantages of the present invention will be apparent to those of skill in the art upon review of the attached drawing figures and the following detailed description of the preferred embodiment of the invention.

DETAILED DESCRIPTION OF THE PREFERRED EMBODIMENT

Figure 1:
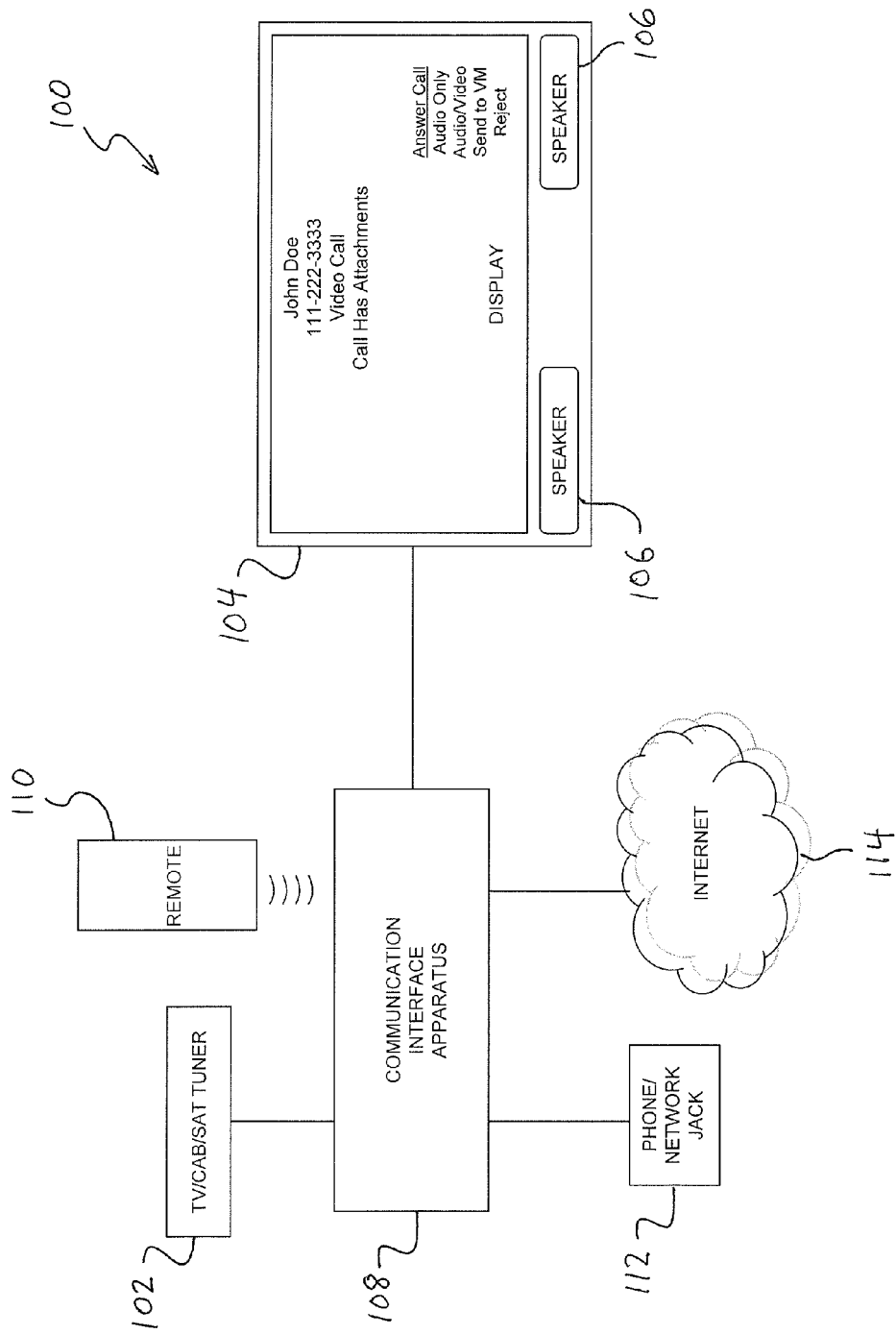
FIG. 1 is a schematic diagram of a communication interface apparatus for incorporating voice or video communication into a television or compatible audio capable visual display according to an embodiment of the present invention.

FIG. 1 shows a system 100 for incorporating voice or video communication into a television or compatible audio capable visual display according to the present invention. The system 100 includes a television tuner 102, a visual display 104 with an audio system including a pair of speakers 106, a communication interface apparatus 108, and a wireless remote no. The communication interface apparatus 108 is interposed between the tuner 102 and the visual display 104 and is connected to a telephone line or computer network via a jack 112 to receive time division multiplexed ("TDM"), broadband, or wireless voice and/or video communications. In an embodiment, the apparatus 108 is also in communication with an external source via the Internet 114.

The television tuner 102 is configured to receive a television signal containing audio and video data from a remote source (e.g., a cable or satellite television provider) and to transmit audio and video signals compatible with the visual display 104. In an embodiment, the tuner 102 transmits a first digital video signal corresponding to the video data and a first audio signal corresponding to the audio data. In a preferred embodiment, the tuner incorporates a digital video recorder that allows users to pause and record television broadcasts. The television tuner 102 can be connected to the communication interface apparatus 108 can be connected using commercially available connectors and cables, including but not limited to HDMI, component, composite and S-video connectors and cables.

The visual display 104 is configured to display video signals received from a television tuner. The display 104 can be any type of conventional display, including but not limited to an LCD, plasma or projection display. In accordance with the present invention, the display 104 receives audio and video signals via the communication interface apparatus 108 and generates a video display and audible sounds based on the audio and video signals. The apparatus 108 and display 104 can be connected using commercially available connectors and cables, including but not limited to HDMI, component, RCA and S-video connectors and cables.

The audio system 106 is configured to receive a second audio signal from the communication interface apparatus 108 and to generate audible sounds based on the audio signal. In the embodiment shown in FIG. 1, the audio system 106 is integrated into the display 104 and includes a pair of speakers. The integrated audio system 106 is connected to the communication interface apparatus 108 via the display 104 using any of the commercially available audio connectors described above. Alternatively, a separate audio system 106, such as a home theatre system, can be connected directly to the communication interface apparatus 108.

Together, the television tuner, visual display and audio system form a conventional television for viewing television broadcasts. The television may be provided as an integral unit or as separate components that are connected together in the manner shown.

The wireless remote control unit no preferably includes a remote control housing adapted for handheld operation and a keypad. A wireless communication device is contained in the remote control housing and is configured to transmit wireless signals to a wireless communication device in the communication interface apparatus 108. As explained in greater detail below, the wireless signals transmitted by the remote preferably include commands for remotely controlling the communication interface apparatus to handle incoming and outgoing calls and to configure the apparatus.

Figure 2:
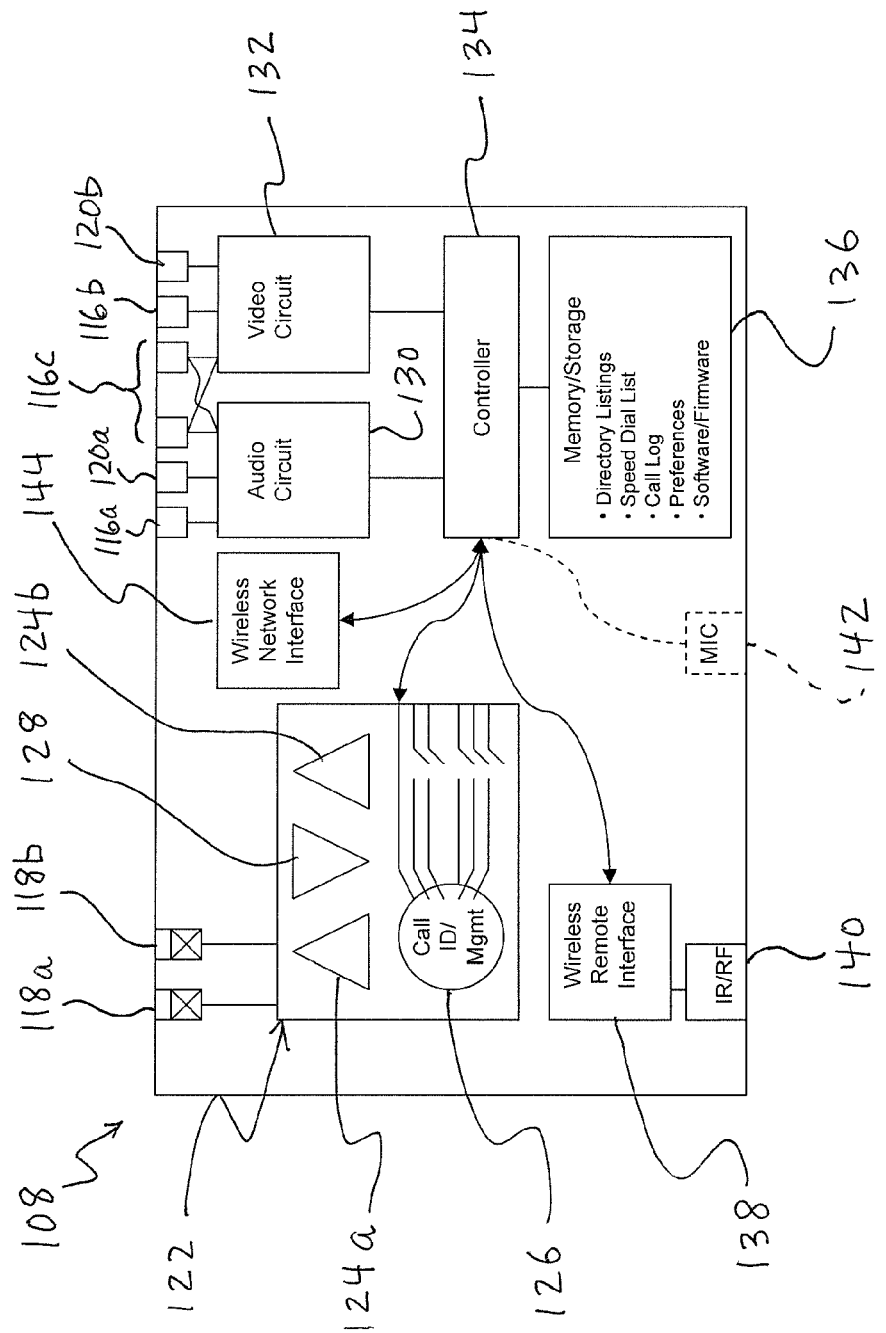
FIG. 2 is a schematic diagram of a communication interface apparatus for incorporating voice or video communication into a television or compatible audio capable visual display according to an embodiment of the present invention.

FIG. 2 shows details of a communication interface apparatus 108 according to an embodiment of the invention. The apparatus 108 includes television inputs 116a & b for receiving audio and video signals from a satellite or cable box (i.e., tuner). Although only two inputs are shown, it will be appreciated that fewer or more inputs can be provided, depending upon the type of connections most commonly used. For example, the video signal can be conveyed by a single S-video connector, multiple component connectors, or integrated with the audio signal using an HDMI connector 116c. Similarly, the audio signal can be conveyed using a stereo phono jack, a pair of RCA jacks, or integrated with the video signal using an HDMI connector. The apparatus 108 also includes two-way communication ports 118a & b for transmitting and receiving over a communication network a voice communication signal containing audio data or a video communication signal containing both audio and visual data. The first communication port 118a is preferably a standard telephone jack, and the second communication port 118b is preferably an Ethernet jack or the like. A pair of output jacks 120a & b are provided for transmitting a second digital video signal and a second audio signal from the communication interface apparatus to the display unit 104. Although only two outputs are shown, it will be appreciated that fewer or more outputs can be provided, depending upon the type of connections desired. For example, the video signal can be conveyed by a single S-video connector, multiple component connectors, or integrated with the audio signal using an HDMI connector. Similarly, the audio signal can be conveyed using a stereo phono jack, a pair of RCA jacks, or integrated with the video signal using an HDMI connector.

The communication interface apparatus 108 includes a call detection and management device 122 connected to the communication ports 118a & b and configured to detect a voice or video communication signal and associated data and to generate a notification signal when a communication signal is detected. The call detection device 122 includes analog and digital modules 124a & b for detecting an analog call via communication port 118a or a digital call via communication port 118b. One or more switches 126 in the communication interface apparatus 108 manage audio, video and data streams from the communication ports. Also shown is a call initiation module 128 for initiating outgoing communications via the communication ports.

Audio and video circuits 130 and 132 disposed within the communication interface apparatus 108 receive audio and video data from the tuner via input connectors 116a, b & c and transmit audio and video signals to the display device via output connectors 120a & b. Audio and video from the tuner is generally compatible with displays of the type contemplated herein and will typically not require any type of conditioning by the audio and video circuits 130 and 132. However, the audio and/or video signals from the communication ports will typically be conditioned (e.g., amplified, filtered, balanced, impedance matched, etc.) by the audio and/or video circuits 130 and 132 to be compatible with the display and sound system.

Operation of the audio and video circuits 130 and 132 and the call detection and management device 122 is controlled by a controller 134. Controller 134 can be any type of suitable computing device but is preferably a microprocessor. One or more digital memory or storage devices 136 preferably store at least one set of instructions (software/firmware) executable by the controller 134 to cause the call detection device 122 to check for calls and transmit notification signals, audio and/or video communication signals, and associated data. The memory 136 can also be used to store directory listings, a speed dial list, call log information, and user preferences. Examples of digital memory or storage devices include magnetic hard drives, flash memory, random access memory, and the like.

The communication interface apparatus 108 preferably also includes a wireless remote interface 138 configured to receive wireless command signals from a handheld remote. The wireless remote interface 138 includes a wireless sensor 140 (e.g., an infrared (IR) or radio-frequency (RF) sensor) for receiving (and, optionally, transmitting) wireless signals from (and to) a handheld remote. The sensor 140 is preferably located on a side of the interface apparatus that normally faces the user. For example, if the apparatus is contained in a box-like housing, the sensor 140 is preferably mounted on the front face of the housing. Commands from the handheld remote are conveyed to the controller via the wireless remote interface 138.

A microphone 142 feeds a user's voice to the communication interface apparatus 108. The microphone 142 can be incorporated into the communication interface apparatus 108 (preferably on the front of the apparatus as shown), the handheld remote, or the display. In any case, the communication interface apparatus is configured to receive the user voice signal from the microphone 142 and to transmit an audio signal over a communication network via one of the communication ports 118a or 118b. Although not shown, it will be appreciated that a small camera or video cam can be incorporated into the communication interface apparatus (preferably on the front of the apparatus), the handheld remote, or the display.

In a preferred embodiment, the communication interface apparatus 108 also includes a wireless network interface 144 for establishing an internet connection. If an internet connection is provided, the memory device can be used to store a second set of digital instructions executable by the controller to check a remote source via the internet connection, e.g., to periodically update the software/firmware or a regional phone directory stored in memory.

Figure 3:
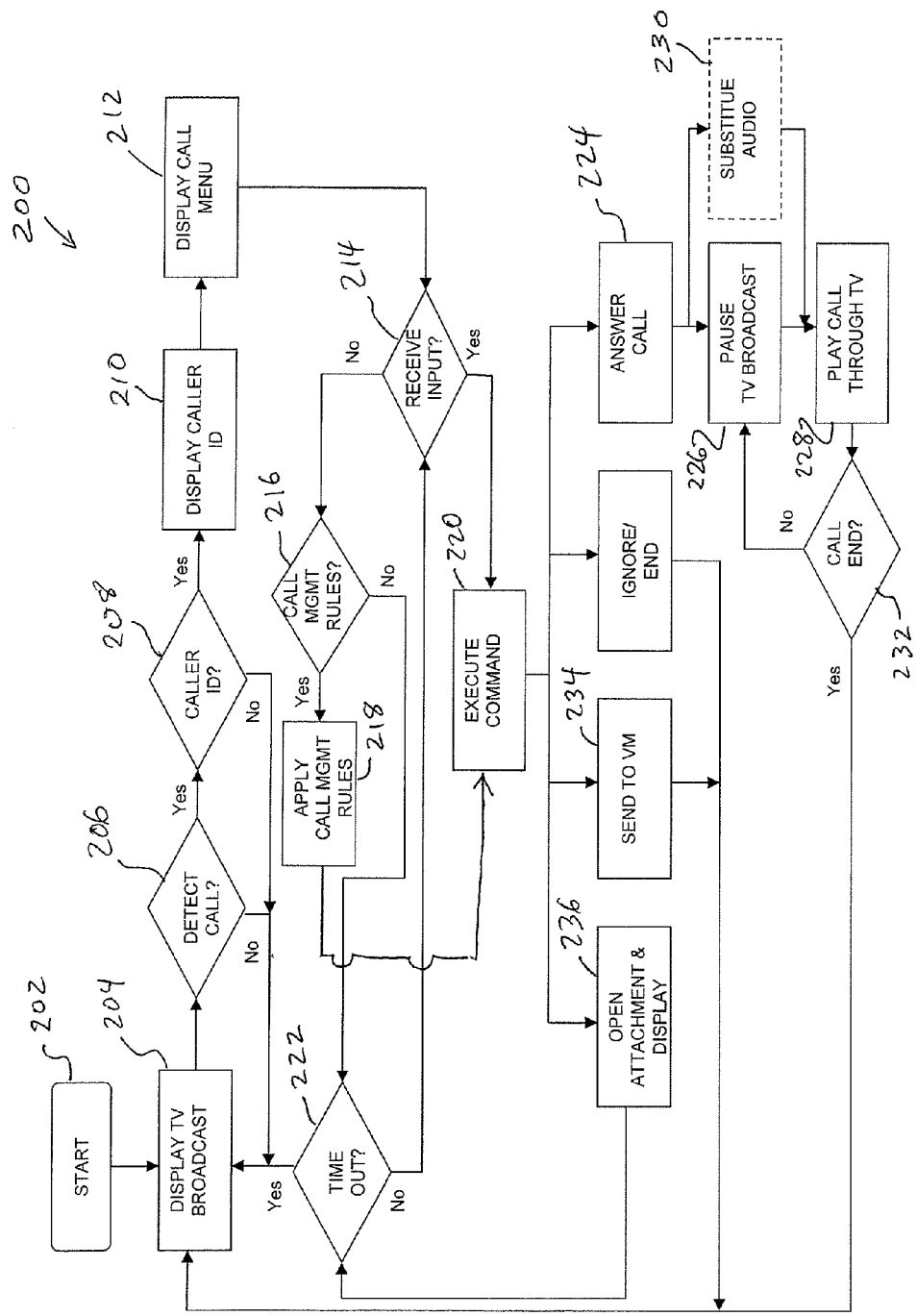
FIG. 3 is a flow chart illustrating a method for incorporating voice or video communication into a television or compatible audio capable visual display according to an embodiment of the present invention.

FIG. 3 illustrates a method 200 of incorporating voice or video communications into a television or compatible audio capable visual display according to an embodiment of the present invention. The method begins at step 202, after connecting the various components together and turning them on, whereupon a television (TV) broadcast is displayed on the visual display 104 in step 204 via the tuner 102 and the communication interface apparatus 108. The communication interface apparatus 108 monitors the communication ports in step 206 and, if no call is detected, the first audio and video signals from the tuner 102 continue to be fed directly to the visual display 104. However, if a call is detected in step 206, the communication interface apparatus 108 obtains data associated with the call, such as caller ID information, and generates a second video signal for superimposing the caller ID information over the TV broadcast, e.g., as shown in FIG. 1. The caller ID information is displayed by the visual display 104 in step 210. For example, the name, phone number and characteristics of the call, including whether the call is audio only or audio and video, and whether the call includes attachments, can be displayed. The communication interface apparatus 108 can also retrieve a call menu from memory 136 and transmit the information to the visual display so that the call menu is displayed with the caller ID information, thus providing the user with all the information they need in order to decide what to do with the call. The menu items or selections preferably include at least "Answer Call" and "Reject/Ignore/End Call." Other selections that can be included in the call menu are "Send to Voice Mail (VM)," "Open Attachment," "Audio Only," and "Audio/Video." In an embodiment, illustrated in FIG. 1, the call menu is displayed on a different portion of the display from the caller ID information to avoid confusion. If desired, the apparatus 108 can also be configured to generate an audio notification that is transmitted to the visual display with the second video signal and used to generate an audible notification when a call is detected in step 206.

In step 214, the apparatus 108 determines whether a menu selection was made. If no menu selection is made, the apparatus 108 determines at step 216 whether call management rules have been established for handling an incoming call. If call management rules exist, the apparatus 108 retrieves the rule in step 218 and executes the command dictated by the rule in step 220. If no call management rules exist, then the controller 108 checks for a time out in step 222, returning to the TV broadcast if a time out has occurred or returning to step 214 to check for a menu selection if a time out has not occurred. The amount of time allowed before the process times out may be predetermined or set by the user. For example, the apparatus 108 may be configured to time out after six rings.

If a command is received in step 214, the apparatus 108 executes the command in step 220. If the command is "Answer Call," the apparatus 108 performs the process shown at 224, preferably by causing the TV broadcast to be paused and recorded at step 226 and playing the call through the TV at step 228. If the system does not include a digital video recorder, the apparatus 108 may be configured to continue feeding the TV video signal while substituting the audio from the call in step 230.

In step 232, the apparatus 108 determines whether the user has terminated or ended the call. If the call has not been terminated, the TV broadcast continues to be paused in step 226 or the audio substituted in step 230. If the apparatus 108 determines that the user has terminated the call, the method returns to step 204 so that the audio and video signals of the TV broadcast are once again fed to the visual display and sound system.

Referring again to step 220, if the apparatus 108 receives the "Send to Voice Mail" command, the call is directed to the voice mail box in step 234 and the process returns to the TV broadcast at step 204. Similarly, if the "Open Attachment" command is received by the apparatus 108 in step 220, any file attached to the communication is opened and displayed on the visual display 104 in step 236. The apparatus 108 checks for a time out in step 222 and continues to display the attachment if the process has not timed out, or it resumes displaying the TV broadcast if a time out has occurred.

If, at any time, a command is received to terminate the call (e.g., the "Ignore/End" command), as shown in step 238, the apparatus 108 terminates any open connection with a communication network and resumes transmitting the audio and video signals from the tuner 102 to the visual display 104 and audio system 106 as shown in step 204

Figure 4:
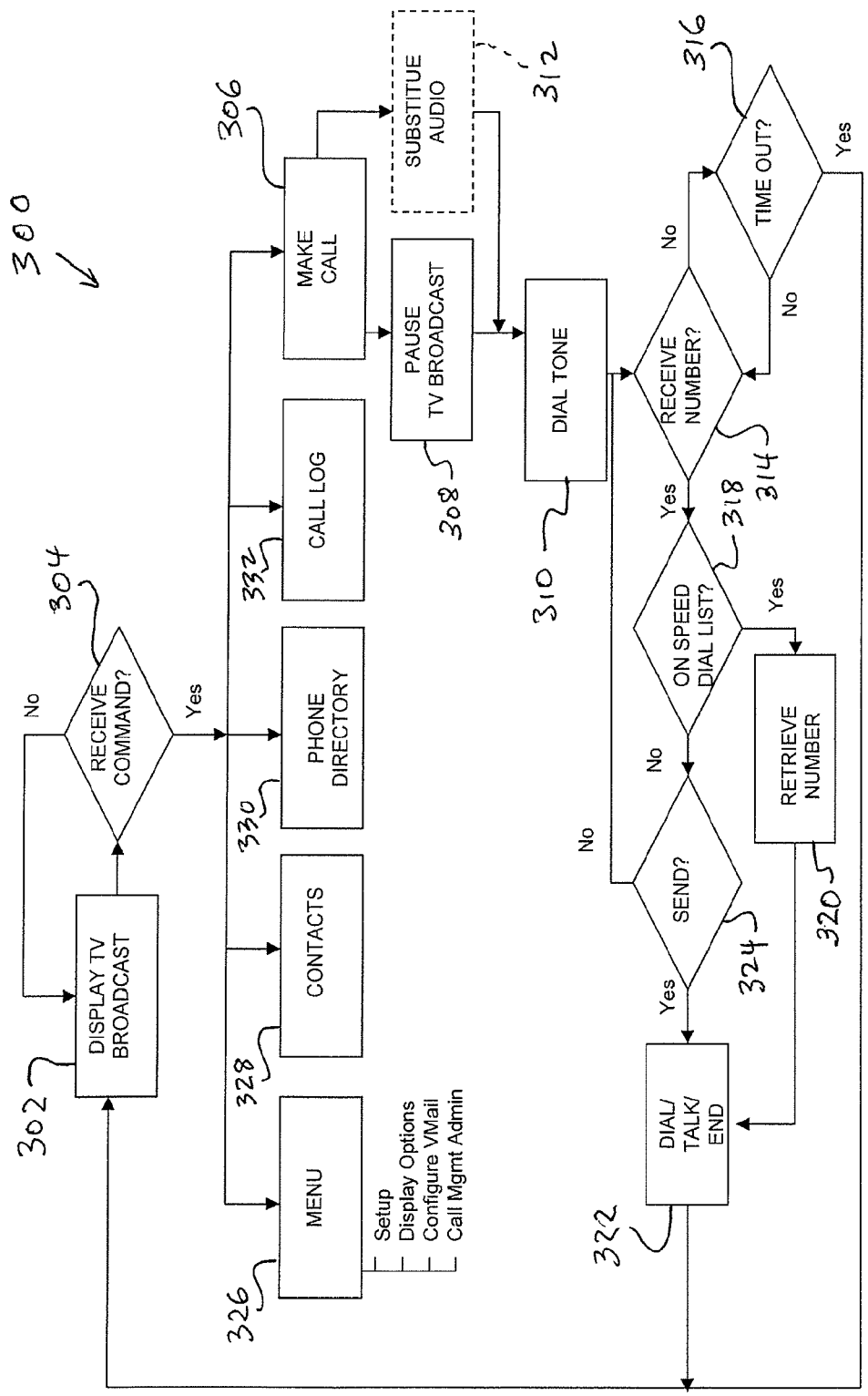
FIG. 4 is a flow chart illustrating a method for incorporating voice or video communication into a television or compatible audio capable visual display according to an embodiment of the present invention.

FIG. 4 illustrates a method 300 of initiating voice or video communications or other actions via a television or compatible audio capable visual display according to an embodiment of the present invention. The method begins at step 302, after connecting the various components together and turning them on, whereupon a television (TV) broadcast is displayed on the visual display 104 via the tuner 102 and the communication interface apparatus 108. The communication interface apparatus 108 monitors the wireless remote interface in step 304 and, if no wireless command from the remote is detected, the first audio and video signals from the tuner 102 continue to be fed directly to the visual display 104. However, if a wireless command from the remote is detected in step 304, the communication interface apparatus 108 takes certain actions to execute the command, e.g., as shown in FIG. 4.

If the communication interface apparatus 108 detects a wireless command to "Make Call," the apparatus 108 performs the process shown at 306, preferably by causing the TV broadcast to be paused and recorded at step 308 and making a connection with a communication network so that a dial tone is heard through the audio system at step 310. If the system does not include a digital video recorder, the apparatus 108 may be configured to continue feeding the TV video signal while substituting the dial tone for the TV audio in step 312.

The apparatus 108 then determines, in step 314, if a number has been entered on the remote and wirelessly transmitted to the apparatus. If the apparatus 108 determines that no number has been entered, it checks for a time out in step 316 and either returns to the TV broadcast if a time out has occurred, or continues to wait for a number to be entered until such time as a time out occurs. If, on the other hand, the apparatus 108 determines in step 314 that a number has been entered on the remote, the apparatus checks in step 318 to see if the number is on the speed dial list stored in memory and if the key corresponding to the number is held for greater than a predetermined period of time. If both conditions are met, the apparatus 108 retrieves the telephone number corresponding to the speed dial number in step 320 and dials the telephone number in step 322. If one or more of the conditions is not met, the apparatus 108 determines in step 324 whether the number was followed by a send command. If the number is not followed by a send command, the apparatus 108 returns to step 314 to receive another number. When a send command is detected, the apparatus 108 dials in step 322 all of the numbers entered before the send command. When the call is completed, the user enters the end command and the apparatus 108 returns to step 302 in which the normal TV broadcast is displayed.

FIG. 4 shows several other commands that can be initiated from the wireless remote no. In an embodiment, the user can cause a menu of various system options to be displayed by entering a "Menu" command in step 326. Examples of system options that can be included on the menu include, without limitation, a setup option, a display option, a configure voice mail (VMail) option, and a call management administration option. The call management option may include submenus allowing the user to define rules for handling unanswered calls, such as ignoring calls that block caller ID. Similarly, the setup option may include submenus allowing the user to select various modes of operation, such as whether the entire TV broadcast should be paused when making or receiving a call or whether the video of the TV broadcast should continue to be displayed while the communication audio is substituted for the TV broadcast audio. Examples of display options include, but are not limited to, showing call information in a screen within screen or as superimposed text, font size or location. The VMail option may allow a user to record an away message, set passwords, delete all messages, and perform other administrative tasks relating to voice mail.

Some of the other commands that can be initiated include, but are not limited to, displaying a user-defined contact list (step 328), displaying a third party regional phone directory (containing residential and/or commercial phone numbers) (step 330), and displaying a phone log (step 332).

From the above, it will be appreciated that the present invention allows voice or video communication to be incorporated into a television or compatible audio capable visual display by routing a television signal through a communication interface apparatus connected to a voice or video communication network and switching between a call and at least the audio portion of the television signal when a call is detected and the user chooses to answer the call in response to an on-screen menu superimposed on the video portion of the television signal. The communication interface apparatus includes a controller that is configured to allow speed dialing using a wireless remote, as well as making calls from a user-defined contact list or a regional phone directory that is updatable from a remote source via the Internet.

The distinct advantage of this invention is the ability to incorporate the function of answering an incoming voice and/or video communication and the ability to initiate outbound voice and/or video communications utilizing an interface through a television set or similar audio capable visual display device. The functions can be built into existing displays, set-top-boxes ("STB") or provided through independent appliances. This invention allows the utilization of a remote with multifunction capabilities, or on-screen selections, to initiate call receipt or to terminate incoming communications.

As an example, a user is sitting on a couch watching a TV program such as the evening news and an incoming communication takes place. The invention can immediately show the caller ID (name and number) on the display being utilized as well as indicators of other characteristics of the communication; these indicators could be; communication has video, communication has attachments, etc; utilizing a remote the user can answer, reject, or handle the incoming communication in another predefined way. In the case the communication is answered, an "Answer" button is selected on the remote, or a selection is made from choices on screen, and the TV audio and/or picture is replaced with the incoming communications. Using the speakers on the TV and an installed microphone, a speaker-phone or video/speaker-phone is created by which a two way communication can be held. In the case of a video communication, the recipient has the option of showing the accompanying communication video stream, either as a PIP (picture-in-picture) or full screen. This feature can be enabled by selecting an appropriate on screen indicator or by a preprogrammed remote button. When the telephone conversation ends and the "End Call" button or onscreen selection is chosen, the communication is terminated and the news program audio and/or video resumes.

There are many additional variables that are possible in the process of using this invention, such as sending the incoming communication to voicemail, filtering unknown callers so they do not interrupt TV viewing, or utilizing a digital recorder, service or device, to pause the live TV program while the communication is received. Furthermore, utilizing an onscreen interface, one can build, form, or access directories, speed-dial lists, history of calls, as well as set calling rules. The user can also utilize the interface to playback recorded audio and/or video messages or retrieve communication's characteristics or attachments right from the TV or display screen being utilized.

While a preferred embodiment of the invention has been described, it will be appreciated that various modifications and changes can be made without departing from the spirit and scope of the invention as set forth in the appended claims.

What is claimed is:

1. A communication interface apparatus comprising:
   at least one television input for receiving a television signal from a television tuner;
   at least one communication input for receiving a separate communication signal from a communication network;
   at least one output for transmitting an output signal from said communication interface apparatus;
   a controller coupled with said television input, said communication input, said output, and
   a non-transitory machine readable medium having encoded thereon a set of instructions executable by the controller to perform one or more operations, the set of instructions comprising instructions to:
   monitor the communication input to detect a communication signal and associated data;
   upon detection of a communication signal without attachments, combine the data associated with the communication signal with the television signal to produce a notification signal superimposing the associated data over the television signal;
   upon detection of a communication signal with at least one attachment, combine data associated with the communication signal and the attachment with the television signal to produce a notification signal superimposing the associated data and an indication of the presence of the attachment over the television signal;
   transmit the notification signal to the output;
   upon detection of a user input command to open the at least one attachment, while the notification signal with at least one attachment is transmitted, open and display the at least one attachment, wherein the attachment includes at least one of video content or voice content; and
   upon detection of a user input command to answer a communication signal comprising a telephone call, record the television signal on a digital video recorder in communication with the output and broadcast the audio portion of the communication signal from a display in communication with the output.

2. The communication interface apparatus of claim 1 further comprising a user input and wherein the instructions executable by said controller further comprise instructions to cause the controller to receive and execute user input commands.

3. The communication interface apparatus of claim 1, further comprising an internet connection coupled with the controller.

4. The communication interface apparatus of claim 3, wherein the instructions executable by said controller further comprise instructions to check a remote source through the internet connection.

5. The communication interface apparatus of claim 4, wherein the non-transitory machine readable medium contains a regional phone directory and the instructions executable by said controller further comprise instructions to periodically update said regional phone directory.

6. The communication interface apparatus of claim 4, wherein the instructions executable by said controller further comprise instructions to filter calls originating from unknown phone numbers so that a notification is not generated when the communication interface apparatus detects a call from an unknown phone number.

7. The communication interface apparatus of claim 1, wherein the associated data includes at least one of caller ID data and call characteristics.

8. The communication interface apparatus of claim 2, wherein the instructions executable by said controller further comprise instructions to display a call menu on a display and, when the call notification is generated, the controller superimposes said call menu over the television signal.

9. The communication interface apparatus of claim 8, wherein the call menu provides users with options to answer a call, reject a call, or send a call to voice mail.

10. The communication interface apparatus of claim 9, wherein the call menu further provides users with options to select audio only or audio and video in the case of a video communication.

11. A method for incorporating voice or video communications into a television signal comprising:
   receiving a television signal at a communications interface apparatus;
   receiving a communication signal at the communications interface apparatus;
   detecting the communications signal at the communications interface apparatus,
   upon detection of a communication signal without attachments, combining data associated with the communication signal with the television signal to produce a notification signal superimposed over the television signal;
   upon detection of a communication signal with at least one attachment, combining data associated with the communication signal and an indication of the presence of the attachment with the television signal to produce a notification signal superimposed over the television signal;
   displaying the content of the notification signal on a display in communication with the communications interface apparatus;
   upon detection of a user input command to open the at least one attachment, while the notification signal with at least one attachment is transmitted, open and display the at least one attachment, wherein the attachment includes at least one of video content or voice content; and
   upon detection of a user input command to answer a communication signal comprising a telephone call, record the television signal on a digital video recorder in communication with the communications interface apparatus and broadcast the audio portion of the communication signal from the display.

12. The method of claim 11 further comprising displaying a call menu having user input options on the display.

13. The method of claim 12 further comprising receiving user input in response to the display of the call menu.

14. The method of claim 13 wherein the user input comprises a user command to open the attachment to the communication signal.

15. The method of claim 14 further comprising displaying the content of the attachment on the display.

16. The method of claim 12 further comprising processing the communication signal in accordance with call management rules if no user input is received through user interaction with the call menu.

17. A system for incorporating voice or video communication into a television or compatible audio capable visual display comprising:
   a television tuner;
   a communication interface apparatus comprising;
      at least one television input for receiving a television signal from the television tuner;
      at least one communication input for receiving a separate communication signal from a communication network;
      at least one output for transmitting an output signal from said communication interface apparatus;
      an input port configured to receive a user input;
   a display in communication with the communication interface output;
   an input device in communication with the communication interface user input;
   a controller coupled with said television input, said communication input, said output; and
   a non-transitory machine readable medium having encoded thereon a set of instructions executable by the controller to perform one or more operations, the set of instructions comprising instructions to:
   monitor the communication input to detect a communication signal and associated data;
   upon detection of a communication signal without attachments, combine the data associated with the communication signal with the television signal to produce a notification signal superimposing the associated data over the television signal;
   upon detection of a communication signal with at least one attachment, combine data associated with the communication signal and the attachment with the television signal to produce a notification signal superimposing the associated data and an indication of the presence of the attachment over the television signal;
   transmit the notification signal to the output;
   upon detection of a user input command to open the at least one attachment, while the notification signal with at least one attachment is transmitted, open and display the at least one attachment, wherein the attachment includes at least one of video content or voice content; and
   upon detection of a user input command to answer a communication signal comprising a telephone call, record the television signal on a digital video recorder in communication with the communications interface apparatus and broadcast the audio portion of the communication signal from the display.

18. The system of claim 17 wherein the input device comprises a wireless remote control.

19. The system of claim 18 wherein the wireless remote control comprises a microphone.

20. The system of claim 17, wherein the communication interface apparatus further comprises an internet connection coupled with the controller and the memory device.

* * * * *